US009011810B2

(12) United States Patent
Kim et al.

(10) Patent No.: US 9,011,810 B2
(45) Date of Patent: Apr. 21, 2015

(54) METHOD FOR SYNTHESIZING ELECTRODE MATERIAL USING POLYOL PROCESS

(75) Inventors: Jae Kook Kim, Gwangju (KR); Dong Han Kim, Gwangju (KR); Tae Ryang Kim, Yeosu-si (KR)

(73) Assignee: Industry Foundation of Chonnam National University, Gwangju (KR)

( * ) Notice: Subject to any disclaimer, the term of this patent is extended or adjusted under 35 U.S.C. 154(b) by 517 days.

(21) Appl. No.: 12/094,604

(22) PCT Filed: Sep. 23, 2006

(86) PCT No.: PCT/KR2006/003786
§ 371 (c)(1),
(2), (4) Date: May 21, 2008

(87) PCT Pub. No.: WO2007/058432
PCT Pub. Date: May 24, 2007

(65) Prior Publication Data
US 2008/0292522 A1 Nov. 27, 2008

(30) Foreign Application Priority Data

Nov. 21, 2005 (KR) ........................ 10-2005-0111121

(51) Int. Cl.
*C01B 25/45* (2006.01)
*C01D 5/00* (2006.01)
(Continued)

(52) U.S. Cl.
CPC ............. *H01M 4/5825* (2013.01); *C01B 25/45* (2013.01); *C01D 5/00* (2013.01); *H01M 4/136* (2013.01); *H01M 10/052* (2013.01)

(58) Field of Classification Search
CPC .................................. C01B 25/45; C01D 5/00
USPC .............. 423/306, 593.1–594.6, 594.15, 518; 252/182.1; 429/218.1–231.95
See application file for complete search history.

(56) References Cited

U.S. PATENT DOCUMENTS

2005/0244321 A1 11/2005 Armand et al.

FOREIGN PATENT DOCUMENTS

| JP | 2000-294238 | 10/2000 |
| JP | 2002-110161 | 4/2002 |

(Continued)

OTHER PUBLICATIONS

Yang et al. "Nonaqueous Sol-Gel Synthesis of High-Performance LiFePO4." Electrochemical and Solid-State Letters, 7 (12), pp. A515-A518 (2004).*

(Continued)

*Primary Examiner* — Brian Walck
(74) *Attorney, Agent, or Firm* — The PL Law Group, PLLC

(57) ABSTRACT

An electrode material obtained using a polyol process and a synthesis method is provided. The synthesis method includes steps of preparing a mixed solution by mixing a transition metal compound, a polyacid anionic compound and a lithium compound with a polyol solvent; and obtaining a resultant product by reacting the mixed solution in a heating apparatus. There is an advantage in that the electrode material, which has crystallinity due to a structure such as an olivine structure or a nasicon structure, can be synthesized using a polyol process at a low temperature without performing a heat treatment proces. The nanoelectrode material synthesized by the method has a high crystallinity, uniform particles, and a structure having a diameter ranging from several nanometers to several micrometers. Further, the electrode material has a high electrochemical stability.

6 Claims, 2 Drawing Sheets

(51) Int. Cl.
*H01M 4/58* (2010.01)
*H01M 4/136* (2010.01)
*H01M 10/052* (2010.01)

(56) References Cited

FOREIGN PATENT DOCUMENTS

| | | |
|---|---|---|
| JP | 2003-323892 | 11/2003 |
| KR | 10-2005-0094346 | 9/2005 |
| KR | 2005-0094346 | 9/2005 |
| WO | WO2007-113624 | 10/2007 |

OTHER PUBLICATIONS

Arnold et al. "Fine-particle lithium iron phosphate LiFePO4 synthesized by a new low-cost aqueous precipitation technique." Journal of Power Sources, 119-121 (2003). pp. 247-251.*

Feldmann, C. et al., Preparation of Sub-Micrometer LnPO4 Particles, Mar. 29, 2002, pp. 1-4, Germany.

Yang, Jingsi et al., Nonaqueous Sol-Gel Synthesis of High-Performance LiFePO4, Jul. 29, 2004, pp. 1-4, New Jersey, U.S.A.

Feldmann, C., Polyol-Mediated Synthesis of Nanoscale Funtional Materials, Jan. 6, 2005, pp. 1-6, Germany.

* cited by examiner

METHOD FOR SYNTHESIZING ELECTRODE MATERIAL USING POLYOL PROCESS

TECHNICAL FIELD

The present invention relates to an electrode material obtained using a polyol process and a synthesis method thereof, and, more particularly, to a method of synthesizing a nanostructured electrode material using a polyol process, in which a heat treatment process, a post-process that is required in a conventional electrode material synthesis method, is not performed, and to an electrode synthesized by the method.

BACKGROUND ART

Recently, according to the rapid development of the electronic industry and communication industry, such as various information and telecommunications technologies including mobile communications technology and the demand for light, thin, short and small electronic equipment, mobile IT products, such as notebook PCs, PDAs, digital cameras, and camcorders, have been widely adopted, and thus small sized lithium ion batteries exhibiting high performance, high capacity and high density have been competitively developed all over the world.

Various materials have been researched with an eye to their use as electrode material for lithium ion batteries. Among the various materials, transition metal oxides, such as $LiCoO_2$, $LiNiO_2$ and $LiMnO_4$, have attracted considerable attention as cathode material for a lithium secondary battery. However, the cathode material for the lithium secondary battery has problems in that environmental problems occur, manufacturing costs thereof are high, and thermal stability thereof decreases when it is in a charged state.

In order to solve the problems, $LiFePO_4$ has been actively researched as an alternative to cathode materials for a secondary battery, such as transition metal oxides.

The $LiFePO_4$ has many advantages in that thermal stability is excellent because $(PO_4)^{3-}$ has a strong covalent bond, the discharge capacity thereof is high, and this discharge capacity only slightly reduced even after undergoing numerous charge and discharge cycles.

However, the $LiFePO_4$ has disadvantages in that the electric conductivity thereof is low and the diffusion rate of lithium ions is low.

As a method for solving the problems, there is a method of improving the rate capability of electrode material by synthesizing an electrode material having small sized particles and a uniform particle distribution. Various methods of synthesizing $LiFePO_4$ having nanostructured particles and a uniform particle distribution, such as a sol-gel method and a solid reaction method, are being researched.

However, a high-temperature post heat treatment process must be performed so as to synthesize $LiFePO_4$ having high crystallinity using the conventional sol-gel method or solid reaction method. Accordingly, there are problems in that the process of synthesizing the $LiFePO_4$ is complicated and the manufacturing cost thereof is increased. Furthermore, there are problems in that particles grow and electric conductivity is decreased.

DISCLOSURE OF INVENTION

Technical Problem

Accordingly, the present invention has been made in order to solve the above problems occurring in the prior art, and an object of the present invention is to provide an electrode material having high crystallinity, a uniform particle structure and high electrochemical stability, in which the electrode material is synthesized using a polyol process at a low temperature without performing a heat treatment process as a post-process, and a method of synthesizing the same.

Technical Solution

In order to accomplish the above object, the present invention provides a method of synthesizing an electrode material using a polyol process. The synthesis method includes the steps of preparing a mixed solution by dissolving a transition metal compound, a polyacid anionic compound and a lithium compound in a polyol solvent; and obtaining a resultant product by reacting the mixed solution in a heating apparatus. A reflux apparatus, a hot plate, a microwave synthesis apparatus or a hydro-thermal synthesis apparatus may be used as the heating apparatus.

The method of synthesizing an electrode material may include the step of cleaning the mixed solution using water, an alcohol solution or an acetone solution, after the step of obtaining a resultant product. Furthermore, the method of synthesizing an electrode material may include the steps of filtering and drying the resultant product, after the step of cleaning the mixed solution.

The polyol solvent may be any one selected from the group consisting of EG (Ethylene Glycol), DEG (Diethylene Glycol), TEG (Triethylene Glycol) and TTEG (Tetraethylene Glycol).

The transition metal compound may be any one selected from the group consisting of an iron compound, a manganese compound, a nickel compound, a cobalt compound, a titanium compound and a vanadium compound, or a mixture thereof. A material containing iron, such as $Fe(CH_3COO)_2$, $Fe(NO_3)_2$, $FeC_2O_2$, $FeSO_4$, $FeCl_2$, $FeI_2$ or $FeF_2$, may be used as the iron compound. A material containing manganese, such as $Mn(CH_3COO)_2$, $Mn(NO_3)_2$, $MnC_2O_2$, $MnSO_4$, $MnCl_2$, $MnI_2$ or $MnF_2$, may be used as the manganese compound. A material containing nickel, such as $Ni(CH_3COO)_2$, $Ni(NO_3)_2$, $NiC_2O_2$, $NiSO_4$, $NiCl_2$, $NiI_2$ or $NiF_2$, may be used as the nickel compound. A material containing cobalt, such as $Co(CH_3COO)_2$, $Co(NO_3)_2$, $CoC_2O_2$, $CoSO_4$, $CoCl_2$, $CoI_2$ or $CoF_2$, may be used as the cobalt compound. A material containing titanium, such as $TiH_2$ or TTIP, may be used as the titanium compound. A material containing vanadium, such as $V(CH_3COO)_2$, $V(NO_3)_2$, $VC_2O_2$, $VSO_4$, $VI_2$, $VI_2$ or $VF_2$, may be used as the vanadium compound.

The polyacid anionic compound may be a phosphoric acid ionic compound or a sulfuric acid ionic compound. A material containing phosphorus, such as $NH_4H_2PO_4$, $H_3PO4$, $(NH_4)_2HPO_4$ or $(NH_4)_3PO_4$, may be used as the phosphoric acid ionic compound. A material containing sulfur, such as $H_2SO_4$, $(NH_4)_2SO_4$, $NH_4HSO_4$, $FeSO_4$, $MnSO_4$, $NiSO_4$, $CoSO_4$, $VSO_4$, or $TiSO_4$, may be used as the sulfuric acid ionic compound.

A material containing lithium, such as $CH_3COOLi$, LiOH, $LiNO_3$, $LiCO_3$, $Li_3PO_4$ or LiF, may be used as the lithium compound.

The resultant product obtained by the method of synthesizing an electrode material may be any one selected from the group consisting of $LiFePO_4$, $LiMnPO_4$, $LiCoPO_4$, $LiNiPO_4$, $LiTiPO_4$, $Li_xV_y(PO_4)_z$, $Li_xTi_y(PO_4)_z$, $LiVPO_4F$, $Li_xFe_y(SO_4)_z$, $Li_xMn_y(SO_4)_z$, $Li_xCo_y(SO_4)_z$, $Li_xNi_y(SO_4)_z$, $Li_xTi_y(SO_4)_z$, or $Li_xV_y(SO_4)_z$, wherein x, y and z are integer numbers.

In the step of obtaining a resultant product by reacting the mixed solution in a heating apparatus, it is preferred that the mixed solution be heated near the boiling point of the polyol solvent. In the case where the polyol solvent is TTEG, the mixed solution may be heated to a temperature of 300 to 350° C. Further, it is preferred that the mixed solution be reacted for a time period ranging from several minutes to 72 hours in a reflux apparatus.

In order to accomplish the above object, the present invention further provides an electrode material synthesized using the polyol process.

The diameter of the electrode material may range from several nanometers to several micrometers, and preferably from 5 to 50 nm.

The electrode material may be used as a cathode material or an anode material for a secondary battery.

Advantageous Effects

As described, according to the present invention, there is an advantage in that an electrode material having an olivine structure or a nasicon structure can be synthesized using a polyol process without performing a heat treatment process, which is a post-process. Further, since the heat treatment process is not performed, there are advantages in that the process of synthesizing the electrode material is simplified, the manufacturing cost of the electrode material is decreased, and the environmental pollution generated during the process of synthesizing the electrode material is decreased. Moreover, there are advantages in that the nanoelectrode material synthesized by the method according to the present invention has high crystallinity, uniform particles, and a structure having a diameter ranging from several nanometers to several micrometers. Further, according to the present invention, the electrode material has a high electrochemical stability such that the initial discharge capacity thereof is high and the discharge capacity of the electrode material is not greatly decreased even though it may be charged and discharged many times.

Although a preferred embodiment of the present invention is disclosed for illustrative purposes, those skilled in the art will appreciate that various modifications, additions and substitutions are possible, without departing from the scope and spirit of the invention as disclosed in the accompanying claims.

BEST MODE FOR CARRYING OUT THE INVENTION

Figure 1:
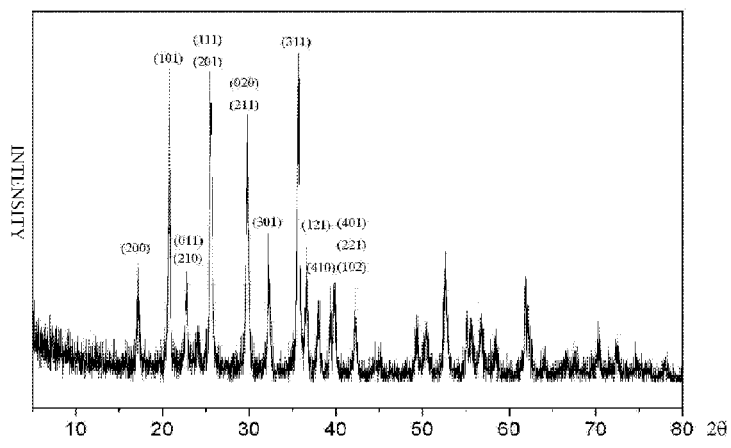
FIG. 1 is a graph showing XRD patterns of a resultant product ($LiFePO_4$) synthesized by a method of synthesizing an electrode material according to an embodiment of the present invention.

Hereinafter, an electrode material obtained using a polyol process and a method of synthesizing the same according to the present invention will be described in detail.

First, a polyol solvent is provided, and then a mixed solution is prepared by dissolving a transition metal compound, a polyacid anionic compound and a lithium compound in a polyol solvent. In the present invention, a polyol process using the polyol solvent was performed to synthesize a nanostructured electrode material having high crystallinity.

The term "polyol" refers to a material having two or more OH groups in a molecule. The polyol serves as a solvent and a stabilizer in the electrode material synthesis process, and serves to inhibit the growth and aggregation of particles. Further, the polyol solvent serves to maintain the oxidation number of the transition metal because it creates a reducing atmosphere at the boiling point thereof.

Alcohol, EG (Ethylene Glycol), DEG (Diethylene Glycol), TEG (Triethylene Glycol) or TTEG (Tetraethylene Glycol) may be used as the polyol solvent.

An iron compound, a manganese compound, a nickel compound, a cobalt compound, a titanium compound or a vanadium compound may be used as the transition metal compound. A material containing iron, such as $Fe(CH_3COO)_2$, $Fe(NO_3)_2$, $FeC_2O_2$, $FeSO_4$, $FeCl_2$, $FeI_2$ or $FeF_2$, may be used as the iron compound.

A phosphoric acid ionic compound or a sulfuric acid ionic compound may be used as the polyacid anionic compound. A material containing phosphorus, such as $NH_4H_2PO_4$, $H_3PO4$, $(NH_4)_2HPO_4$ or $(NH_4)_3PO_4$, may be used as the phosphoric acid ionic compound. A material containing sulfur, such as $H_2SO_4$, $(NH_4)_2SO_4$, $NH_4HSO_4$, $FeSO_4$, $MnSO_4$, $NiSO_4$, $CoSO_4$, $VSO_4$, or $TiSO_4$, may be used as the sulfuric acid ionic compound.

A material containing lithium, such as $CH_3COOLi$, $LiOH$, $LiNO_3$, $LiCO_3$, $Li_3PO_4$ or $LiF$, may be used as the lithium compound.

Next, a resultant product is obtained by reacting the mixed solution, in which a transition metal compound, a polyacid anionic compound and a lithium compound are dissolved in a polyol solvent, using a reflux apparatus. The reflux apparatus comprises a heating unit, a magnetic stirrer, a unit for preventing the evaporation of the solvent through a condenser, and a round flask.

The mixed solution is heated in the round flask of the reflux apparatus to near the boiling point of the polyol solvent. It is preferred that the reaction time of the mixed solution range from several minutes to 72 hours.

Various resultant products, such as $LiFePO_4$, $LiMnPO_4$, $LiCoPO_4$, $LiNiPO_4$, $LiTiPO_4$, $LiVPO_4$, $LiVPO_4F$ (nasicon structure), $LiFeSO_4$, $LiMnSO_4$, $LiCoSO_4$, $LiNiSO_4$, $LiTiSO_4$ and $LiVSO_4$, can be obtained by the method of synthesizing an electrode material.

If necessary, a process of cleaning the mixed solution, that is, a process of removing the remaining polyol solvent or additionally formed organic compounds after the reaction, may be performed after the process of obtaining a resultant product. The process of cleaning the mixed solution may be performed using water, an alcohol solution or an acetone solution. It is preferred that the process of cleaning the mixed solution be repeated several times until the remaining polyol solvent or the additionally formed organic compound is completely removed.

Further, a process of filtering the resultant product from the mixed solution may be performed. Then, the resultant product is dried in a vacuum oven. The dried resultant product, as described below, has a nanocrystal structure of several nanometers in size.

As described above, when a polyol process according to the present invention is used, a nanoelectrode material can be synthesized at a low temperature without performing a heat treatment process, which is a post-process. The nanoelectrode material synthesized using the polyol process has a structure having uniform particles and a diameter thereof ranging from several nanometers to several micrometers.

MODE FOR THE INVENTION

Hereinafter, the present invention will be described in detail with reference to an Example. The following Example is only an aspect of the present invention, and the present invention is not limited thereto.

Example 1

A mixed solution is prepared by adding $Fe(CH_3COO)_2$, which is a transition metal compound, $NH_4H_2PO_4$, which is a phosphoric acid ionic compound, and $CH_3COOLi$, which is a lithium compound, to a TTEG (Tetraethylene Glycol) solvent. Here, the added $Fe(CH_3COO)_2$, $NH_4H_2PO_4$ and $CH_3COOLi$ are mixed such that the molar ratio thereof is 1:1:1. A resultant product ($LiFePO_4$, olivine structure), which is an electrode material, is obtained by reacting the mixed solution in a round flask of a reflux apparatus to the boiling point (335° C.) of the TTEG solvent for 16 hours. Since the polyol solvent creates a reducing atmosphere at the boiling point thereof, the polyol solvent maintains the oxidation number of Fe to be +2 valent. The mixed solution is cleaned several times after the reaction using acetone, so as to remove organic compounds, formed during the reaction, and any remaining TTEG solvent. Then, the resultant product is filtered from the mixed solution using a ceramic filter. Subsequently, the resultant product is dried in a vacuum oven at a temperature of 150° C. for 24 hours.

FIG. 1 is a graph showing XRD patterns of a resultant product ($LiFePO_4$) synthesized by a method of synthesizing an electrode material according to an embodiment of the present invention.

Referring to FIG. 1, it is clearly shown that the resultant product has the olivine structure, characteristic of an orthorhombic system, by all of the peaks shown in the XRD patterns. The parameter values of the measured unit cell, in which a=10.350 Å, b=6.005 Å, c=4.696 Å, is almost equal to the parameter values of the reported unit cell. That is, it can be seen that the LiFePO4 having an olivine structure can be synthesized using the polyol process.

Meanwhile, the diameters of particles were measured using the Scherrer formula. As a result, it was found that the particles of the resultant product had diameters of about 40 nm.

As shown by the XRD patterns, it was found that a pure single phase $LiFePO_4$ (olivine structure) containing no impurities such as $Li_3PO_4$ and iron mixtures was formed using the polyol process according to an embodiment of the present invention.

Figure 2:
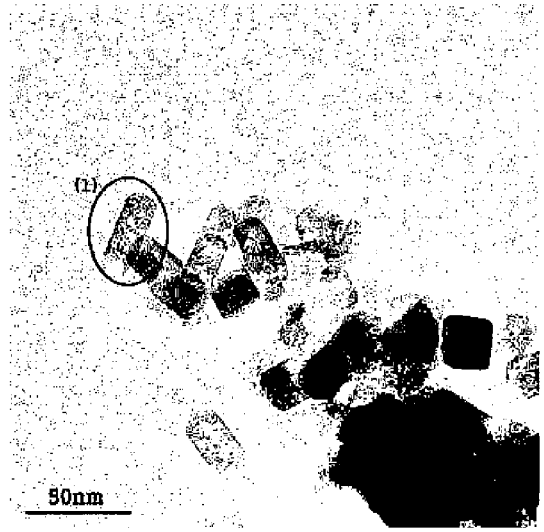
FIG. 2 is an FETEM photograph showing a resultant product ($LiFePO_4$) synthesized by a method of synthesizing an electrode material according to an embodiment of the present invention.
Figure 3:
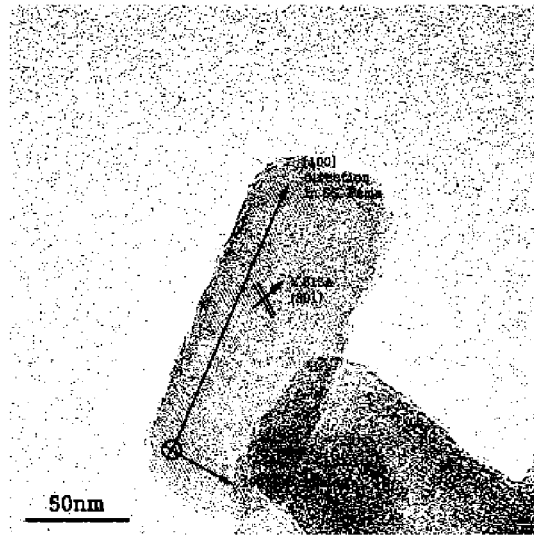
FIG. 3 is an enlarged view of the portion (1) shown in FIG. 2.

FIG. 2 is an FETEM photograph showing a resultant product ($LiFePO_4$) synthesized by a method of synthesizing an electrode material according to an embodiment of the present invention, and FIG. 3 is an enlarged view of the portion (1) shown in FIG. 2.

Referring to FIGS. 2 and 3, it can be seen that nanosized particles were formed and that the particles were uniformly distributed. In the form of particles, it was found that most of the particles had the form of an orthorhombic system.

Referring to FIG. 3, it can be seen that the particles have high crystallinity, an average diameter of about 15 nm and an average length of 50 nm.

Further, it can be seen that the interplanar spacing (spacing between (301) planes) is about 2.81 Å, and that the particles grew in the [100] direction.

As shown in the FETEM photograph, it can be seen that $LiFePO_4$, having an olivine structure in which nanosized particles were uniformly distributed and had high crystallinity, was synthesized using the polyol process according to the embodiment of the present invention.

Further, the molar ratio of Li, Fe and $PO_4$ was determined to be 1:1:1 using an ICP-AES.

Figure 4:
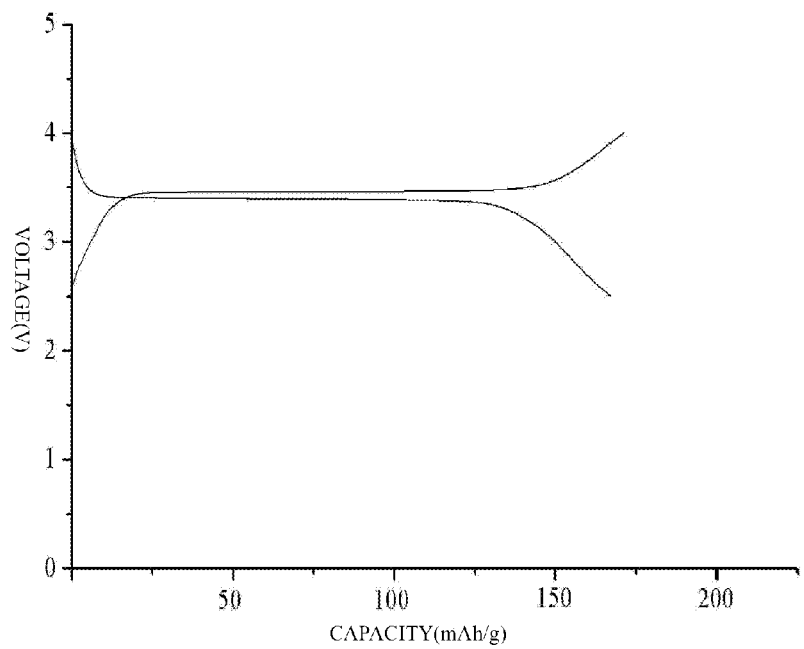
FIG. 4 is a graph showing the initial discharge capacity characteristics of a secondary battery manufactured using the resultant product ($LiFePO_4$) according to an embodiment of the present invention.

FIG. 4 is a graph showing the initial discharge capacity characteristics of a secondary battery manufactured using the resultant product ($LiFePO_4$) according to an embodiment of the present invention. In FIG. 4, the initial discharge capacity of the secondary battery manufactured using the synthesized resultant product, which was measured in a voltage range of 2.5 to 4.0 V at a current density of 0.1 mA/□ during one cycle, is profiled.

A secondary battery was manufactured using the resultant product in order to evaluate the electrochemical characteristics of the $LiFePO_4$ obtained according to the embodiment of the present invention. First, the $LiFePO_4$ was mixed with carbon black and a PTFE binder to obtain a mixture. The mixture was compressed using a stainless steel mesh and was then dried in a vacuum at a temperature of 180° C. for 5 hours, thereby manufacturing an electrode for a secondary battery. The secondary battery was manufactured by using the dried mixture as a cathode, using lithium metal as an anode and using a mixture, in which ethylene carbonate and DMC (Dimethyl Carbonate) containing 1M of $LiPF_6$ were mixed at a ratio of 1:1, as an electrolyte.

Referring to FIG. 4, it can be seen that the charge capacity of the secondary battery was about 168 mAh/g, and the discharge capacity thereof was about 166 mAh/g. Furthermore, it can be seen that the charge or discharge capacity thereof was similar to the theoretical charge or discharge capacity thereof, and that the voltage flatness thereof was extremely high. Accordingly, the secondary battery manufactured using the resultant product exhibits excellent electrochemical characteristics.

Figure 5:
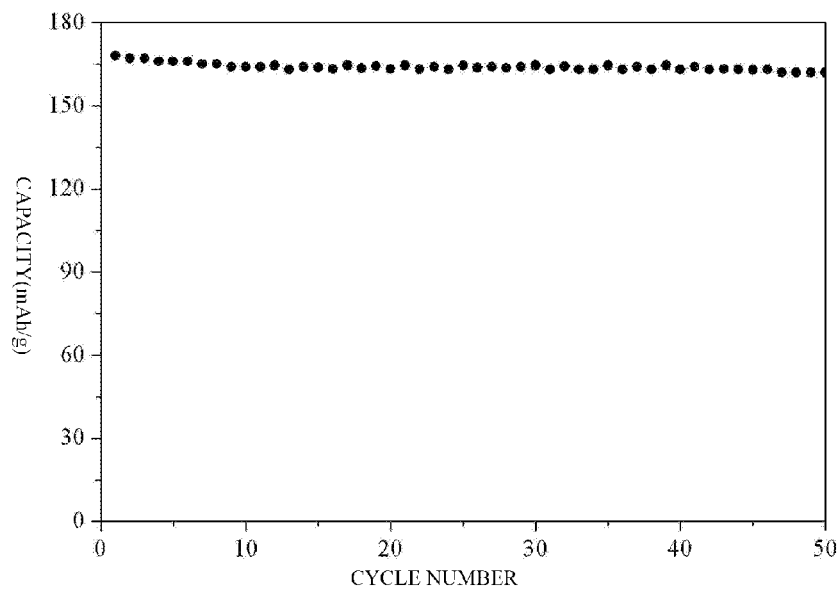
FIG. 5 is a graph showing the discharge capacity characteristics per cycle of a secondary battery manufactured using the resultant product ($LiFePO_4$) according to an embodiment of the present invention.

FIG. 5 is a graph showing the initial discharge capacity characteristics of a secondary battery manufactured using the resultant product ($LiFePO_4$) according to the embodiment of the present invention. In FIG. 5, the initial discharge capacity of the secondary battery, manufactured using the synthesized resultant product, which was measured in a voltage range of 2.5 to 4.0 V at a current density of 0.1 mA/□ for 50 cycles, is shown.

Referring to FIG. 5, it can be seen that the discharge capacity characteristics of the secondary battery were not decreased and remained almost constant. Since the average discharge capacity of the secondary battery was about 163 mAh/g, the secondary battery manufactured using the resultant product was determined to exhibit excellent electrochemical characteristics.

Accordingly, the resultant product ($LiFePO_4$) according to an embodiment of the present invention is a material in which nanosized particles having high crystallinity, capable of overcoming low electric conductivity and low diffusion of lithium ions, were uniformly distributed.

Further, according to the polyol process of the present invention, it is possible to improve the electrochemical characteristics by reducing the path for moving the lithium ions from the center of the particle to the surface thereof through a lattice.

INDUSTRIAL APPLICABILITY

The present invention relates to an electrode material obtained using a polyol process and a method of synthesizing the same. According to the present invention, an electrode, which has high crystallinity, uniform particles and a structure having a diameter ranging from several nanometers to several micrometers, can be synthesized. The electrode material has a high electrochemical stability such that the discharge capacity of the electrode material is not greatly decreased even though the initial discharge capacity thereof is high and it is charged and discharged many times. Accordingly, the electrode material manufactured by the method according to the present invention can be used as an electrode material of a small sized lithium ion battery having high performance, high capacity and high density, which is used in mobile IT products such as notebook PCs, PDAs, digital cameras and camcorders.

The invention claimed is:

1. A method of synthesizing an electrode material, comprising:

preparing a mixed solution by dissolving a transition metal compound, a polyacid anionic compound and a lithium compound in a polyol solvent, wherein the transition metal compound is any one selected from $Fe(CH_3COO)_2$, $Fe(NO_3)_2$, $FeC_2O_2$, $FeSO_4$, $FeCl_2$, $FeI_2$ and $FeF_2$, $Mn(CH_3COO)_2$, $Mn(NO_3)_2$, $MnC_2O_2$, $MnSO_4$, $MnCl_2$, $MnI_2$ and $MnF_2$, $Ni(CH_3COO)_2$, $Ni(NO_3)_2$, $NiC_2O_2$, $NiSO_4$, $NiCl_2$, $NiI_2$ and $NiF_2$, $Co(CH_3COO)_2$, $Co(NO_3)_2$, $CoC_2O_2$, $CoSO_4$, $CoCl_2$, $CoI_2$ and $CoF_2$, $TiH_2$ or TTIP, $V(CH_3COO)_2$, $V(NO_3)_2$, $VC_2O_2$, $VSO_4$, $VCl_2$, $VI_2$ and $VF_2$, or a mixture thereof;

wherein the polyacid anionic compound is any one selected from $NH_4H_2PO_4$, $H_3PO4$, $(NH_4)_2HPO_4$, $(NH_4)_3PO_4$, $H_2SO_4$, $(NH_4)_2SO_4$, $NH_4HSO_4$, $FeSO_4$, $MnSO_4$, $NiSO_4$, $CoSO_4$, $VSO_4$, and $TiSO_4$, wherein the lithium compound is any one selected from the group consisting of $CH_3COOLi$, $LiOH$, $LiNO_3$, $LiCO_3$, $Li_3PO_4$ and $LiF$; and wherein the polyol solvent is any one selected from the group consisting of Ethylene Glycol, Diethylene Glycol, Triethylene Glycol and Tetraethylene Glycol; and reacting the mixed solution about a boiling point of the polyol solvent to obtain a resultant product having a nanocrystal structure.

2. The method of synthesizing an electrode material according to claim 1, wherein the method further comprises cleaning the mixed solution using water, an alcohol solution or an acetone solution, after obtaining the resultant product.

3. The method of synthesizing an electrode material according to claim 2, wherein the method further comprises filtering the resultant product; and drying the resultant product, after cleaning the mixed solution.

4. The method of synthesizing an electrode material according to claim 1, wherein the obtained resultant product is any one selected from the group consisting of $LiFePO_4$, $LiMnPO_4$, $LiCoPO_4$, $LiNiPO_4$, $LiTiPO_4$, $Li_xV_y(PO_4)_z$, $Li_xTi_y(PO_4)_z$, $LiVPO_4F$, $Li_xFe_y(SO_4)_z$, $Li_xMn_y(SO_4)_z$, $Li_xCo_y(SO_4)_z$, $Li_xNi_y(SO_4)_z$, $Li_xTi_y(SO_4)_z$ or $Li_xV_y(SO_4)_z$, wherein x, y and z are integer numbers.

5. The method of synthesizing an electrode material according to claim 1, wherein the mixed solution is reacted for a time period ranging from several minutes to 72 hours.

6. The method of synthesizing an electrode material according to claim 1, wherein the nanocrystal structure comprises an olivine structure or a nasicon structure.

* * * * *